US011275211B2

(12) United States Patent
Kopinetz et al.

(10) Patent No.: US 11,275,211 B2
(45) Date of Patent: Mar. 15, 2022

(54) FIBER ARRAY UNIT WITH UNFINISHED ENDFACE

(71) Applicant: Cisco Technology, Inc., San Jose, CA (US)

(72) Inventors: Anthony D. Kopinetz, York, PA (US); Ashley J. Maker, Pleasanton, CA (US); Jarrett S. Neiman, Coopersburg, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/445,038

(22) Filed: Jun. 18, 2019

(65) Prior Publication Data
US 2020/0400890 A1 Dec. 24, 2020

(51) Int. Cl.
*G02B 6/30* (2006.01)

(52) U.S. Cl.
CPC ............ *G02B 6/30* (2013.01); *G02B 6/305* (2013.01)

(58) Field of Classification Search
CPC ............ G02B 6/14; G02B 6/30; G02B 6/00
USPC .......................................................... 385/50
See application file for complete search history.

(56) References Cited

U.S. PATENT DOCUMENTS

| 4,653,845 | A | * | 3/1987 | Tremblay | G02B 6/40 385/46 |
|---|---|---|---|---|---|
| 4,973,127 | A | * | 11/1990 | Cannon, Jr | G02B 6/3839 156/158 |
| 5,321,785 | A | * | 6/1994 | Iida | G02B 6/2931 359/900 |
| 5,479,549 | A | * | 12/1995 | Kurata | B24B 19/226 385/88 |
| 5,629,997 | A | * | 5/1997 | Hardy, Jr. | G02B 6/4203 385/146 |
| 5,708,741 | A | * | 1/1998 | DeVeau | G02B 6/30 385/49 |
| 5,841,931 | A | * | 11/1998 | Foresi | G02B 6/10 385/131 |
| 6,879,757 | B1 | | 4/2005 | Zhou et al. | |
| 7,260,293 | B1 | * | 8/2007 | Gunn, III | G02B 6/124 385/37 |

(Continued)

FOREIGN PATENT DOCUMENTS

| EP | 0654451 A2 | 5/1995 |
|---|---|---|
| JP | 4306585 B2 | 8/2009 |

OTHER PUBLICATIONS

PCT Notification of Transmittal of the Internatinoal Search Report and the Written Opinion of the International Searching Authority, or the Declaration for Application No. PCT/US2020/018477 dated May 12, 2020.

(Continued)

*Primary Examiner* — Kaveh C Kianni
(74) *Attorney, Agent, or Firm* — Patterson + Sheridan, LLP (57) ABSTRACT

A method of manufacturing an optical apparatus comprises forming an unfinished endface of a fiber array unit (FAU) that provides an arrangement of one or more optical fibers. The one or more optical fibers terminate at the unfinished endface. The method further comprises optically aligning the FAU with an external light-carrying medium. The one or more optical fibers are optically coupled with the external light-carrying medium through the unfinished endface.

20 Claims, 8 Drawing Sheets

(56) References Cited

U.S. PATENT DOCUMENTS

| | | | | |
|---|---|---|---|---|
| 7,391,801 B1* | 6/2008 | Soret | ............... | H01S 5/026 |
| | | | | 372/92 |
| 7,719,678 B2* | 5/2010 | Kamins | ............... | B82Y 20/00 |
| | | | | 356/301 |
| 7,778,501 B2* | 8/2010 | Beausoleil | ............... | B82Y 20/00 |
| | | | | 385/14 |
| 8,189,968 B2* | 5/2012 | Chen | ............... | B82Y 20/00 |
| | | | | 385/15 |
| 8,390,922 B1* | 3/2013 | Baehr-Jones | ............... | G02F 1/395 |
| | | | | 359/332 |
| 8,442,368 B1* | 5/2013 | Reano | ............... | G02B 6/136 |
| | | | | 385/39 |
| 8,531,527 B2* | 9/2013 | Chang | ............... | G01H 9/006 |
| | | | | 348/163 |
| 8,554,022 B1* | 10/2013 | Hochberg | ............... | H01L 31/028 |
| | | | | 385/1 |
| 8,582,931 B1* | 11/2013 | Vawter | ............... | G02F 1/3133 |
| | | | | 385/14 |
| 8,625,939 B1* | 1/2014 | Rakich | ............... | G02B 6/12007 |
| | | | | 385/27 |
| 8,876,401 B2* | 11/2014 | Shiraishi | ............... | G02B 6/325 |
| | | | | 385/53 |
| 9,128,285 B2* | 9/2015 | Martinez | ............... | G02B 27/0172 |
| 9,164,235 B1 | 10/2015 | Tummidi et al. | | |
| 9,261,556 B2* | 2/2016 | McShane | ............... | G02B 6/30 |
| 9,274,275 B2 | 3/2016 | Webster et al. | | |
| 9,297,945 B2* | 3/2016 | Ide | ............... | G02B 6/4249 |
| 9,316,788 B2* | 4/2016 | Witzens | ............... | G02B 6/125 |
| 9,459,177 B1 | 10/2016 | Dong et al. | | |
| 9,529,155 B2* | 12/2016 | Bhagavatula | ............... | G02B 6/3885 |
| 9,618,699 B2 | 4/2017 | Tummidi et al. | | |
| 9,651,739 B2 | 5/2017 | Webster et al. | | |
| 9,864,133 B2 | 1/2018 | Patel et al. | | |
| 9,933,566 B2 | 4/2018 | Patel et al. | | |
| 9,964,706 B2* | 5/2018 | He | ............... | G02B 6/38 |
| 10,054,745 B2 | 8/2018 | Webster et al. | | |
| 10,094,989 B2* | 10/2018 | Murakami | ............... | G02B 6/4243 |
| 10,145,758 B2 | 12/2018 | Traverso et al. | | |
| 10,379,293 B2* | 8/2019 | Nakazuru | ............... | G02B 6/32 |
| 10,725,244 B2* | 7/2020 | Paquet | ............... | G02B 6/30 |
| 10,782,474 B2* | 9/2020 | Brusberg | ............... | G02B 6/403 |
| 2002/0001435 A1* | 1/2002 | Steinberg | ............... | G02B 6/122 |
| | | | | 385/49 |
| 2002/0118917 A1* | 8/2002 | Kawai | ............... | G02B 6/42 |
| | | | | 385/31 |
| 2003/0059190 A1* | 3/2003 | Gunn, III | ............... | G02B 6/1225 |
| | | | | 385/130 |
| 2003/0068152 A1* | 4/2003 | Gunn, III | ............... | G02B 6/26 |
| | | | | 385/129 |
| 2003/0095753 A1* | 5/2003 | Wada | ............... | G02B 6/3863 |
| | | | | 385/78 |
| 2003/0198457 A1* | 10/2003 | Matsui | ............... | G02B 6/25 |
| | | | | 385/147 |
| 2004/0037497 A1* | 2/2004 | Lee | ............... | G02B 6/1228 |
| | | | | 385/28 |
| 2004/0105650 A1* | 6/2004 | Imaki | ............... | G02B 6/3672 |
| | | | | 385/137 |
| 2004/0204613 A1* | 10/2004 | Wolf | ............... | C08F 2/50 |
| | | | | 568/14 |
| 2005/0207705 A1* | 9/2005 | Laurent-Lund | ............... | G02B 6/125 |
| | | | | 385/45 |
| 2006/0215964 A1* | 9/2006 | Kuroda | ............... | G02B 6/30 |
| | | | | 385/49 |
| 2007/0086712 A1* | 4/2007 | Shani | ............... | G02B 6/0046 |
| | | | | 385/101 |
| 2007/0090089 A1* | 4/2007 | Chang | ............... | G02B 6/1228 |
| | | | | 216/41 |
| 2007/0104441 A1* | 5/2007 | Ahn | ............... | G02B 6/12004 |
| | | | | 385/129 |
| 2009/0220184 A1* | 9/2009 | Goldring | ............... | G01N 21/7746 |
| | | | | 385/2 |
| 2010/0246617 A1* | 9/2010 | Jones | ............... | G02B 6/29325 |
| | | | | 372/26 |
| 2011/0069730 A1* | 3/2011 | Strittmatter | ............... | H01S 5/34333 |
| | | | | 372/45.01 |
| 2011/0073989 A1* | 3/2011 | Rong | ............... | H01L 29/94 |
| | | | | 257/532 |
| 2011/0097033 A1* | 4/2011 | Su | ............... | G02B 6/12004 |
| | | | | 385/14 |
| 2011/0235968 A1* | 9/2011 | Na | ............... | G02B 6/26 |
| | | | | 385/28 |
| 2012/0002924 A1* | 1/2012 | Okayama | ............... | G02B 6/125 |
| | | | | 385/46 |
| 2012/0093456 A1 | 4/2012 | Taillaert et al. | | |
| 2012/0224809 A1* | 9/2012 | Ootorii | ............... | G02B 6/32 |
| | | | | 385/33 |
| 2013/0142476 A1* | 6/2013 | Dallesasse | ............... | G02F 1/0036 |
| | | | | 385/11 |
| 2013/0209112 A1* | 8/2013 | Witzens | ............... | G02B 6/423 |
| | | | | 398/214 |
| 2013/0322813 A1* | 12/2013 | Grondin | ............... | G02B 6/1223 |
| | | | | 385/14 |
| 2014/0153600 A1* | 6/2014 | Luo | ............... | B82Y 20/00 |
| | | | | 372/40 |
| 2014/0161384 A1* | 6/2014 | Dwivedi | ............... | G02B 6/125 |
| | | | | 385/1 |
| 2015/0168646 A1* | 6/2015 | Arai | ............... | G02B 6/428 |
| | | | | 385/14 |
| 2016/0187592 A1* | 6/2016 | Woodward | ............... | G02B 6/3863 |
| | | | | 385/85 |
| 2018/0313718 A1 | 11/2018 | Traverso et al. | | |
| 2019/0353844 A1* | 11/2019 | Nakanishi | ............... | G02B 6/305 |

OTHER PUBLICATIONS

U.S. Appl. No. 16/421,801 "Edge Coupling Through Unetched Surface of Photonic Chip," as filed May 24, 2019.

PCT Notification of Transmittal of the International Search Report and the Written Opinino of the International Searching Authority, or the Declaration for Application No. PCT/US2020/037865 dated Sep. 11, 2020.

Oh Jin Kyoung et al., "A 1 x 8 Splitter Chip with Integrated Fiber Grooves for Relable Passive Alignment of Fiber Arrays," IEEE Photonics Technology Letters, IEEE Service Center, Feb. 1, 2015, pp. 249-252. Abstract Only.

\* cited by examiner

FIBER ARRAY UNIT WITH UNFINISHED ENDFACE

TECHNICAL FIELD

Embodiments presented in this disclosure generally relate to optical apparatus, and more specifically, to techniques for manufacturing an optical apparatus having a fiber array unit (FAU) with an unfinished endface.

BACKGROUND

In an optical apparatus, such as a transceiver module for an optical networking system, one of the most expensive components is a FAU that arranges one or more optical fibers for optical coupling with other components of the optical apparatus. The one or more optical fibers extend along the FAU and terminate at an endface of the FAU, such that light enters and/or exits the one or more optical fibers at the endface. Consequently, endface processing of the FAU is conventionally viewed as being important to achieve suitable optical performance (e.g., to reduce optical losses due to scattering or defects).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment is a method of manufacturing an optical apparatus, the method comprising forming an unfinished endface of a fiber array unit (FAU) that provides an arrangement of one or more optical fibers. The one or more optical fibers terminate at the unfinished endface. The method further comprises optically aligning the FAU with an external light-carrying medium. The one or more optical fibers are optically coupled with the external light-carrying medium through the unfinished endface.

Another embodiment is an apparatus comprising one or more optical fibers, and a fiber array unit (FAU) providing an arrangement of the one or more optical fibers. The FAU defines an unfinished endface at which the one or more optical fibers terminate. The apparatus further comprises an external light-carrying medium optically coupled with the one or more optical fibers through the unfinished endface.

Another embodiment is a method of manufacturing an optical apparatus, the method comprising providing a fiber array unit (FAU) that provides an arrangement of one or more optical fibers. The one or more optical fibers terminate at an endface of the FAU having an average roughness (Ra) that is greater than 1.0 microinch. The method further comprises optically aligning the FAU with an external light-carrying medium. The one or more optical fibers are optically coupled with the external light-carrying medium through the endface.

Example Embodiments

Embodiments herein describe techniques for manufacturing an optical apparatus having a FAU with an unfinished endface. Endface processing of the FAU may be the most limiting step of the FAU fabrication, being both costly and time consuming. Beneficially, fabricating the FAU using fewer and/or selected processes provides a substantial cost savings and/or increases throughput during fabrication, while ultimately supporting a suitable optical performance.

In some embodiments, forming the unfinished endface of the FAU comprises one or more of: mechanical sawing, surface grinding, scribing and cleaving, and coarse polishing. Thus, the unfinished endface of the FAU may be formed without performing a fine polishing process on the endface. In some cases, the unfinished endface of the FAU may be formed without performing any polishing processes at all. In some embodiments, the unfinished endface of the FAU has an average roughness (Ra) that is greater than 1.0 microinch, such as within a range between about 1.0 microinch and about 9.0 microinches. In some embodiments, the endface of the FAU is formed by mechanically sawing (e.g., using a wet saw) the FAU using a saw blade having a grit number between 400 and 1200.

In some embodiments, an index-matching material (e.g., an index-matching epoxy) is applied between the unfinished endface and an external light-carrying medium, and the one or more optical fibers are optically coupled with the external light-carrying medium through the index-matching material. Use of the index-matching material makes the coupled light much less sensitive to the quality of the optical fiber endface, as the refractive index remains substantially constant during the transition between the optical fiber and the external light-carrying medium.

In some embodiments, the external light-carrying medium comprises one or more optical waveguides of a photonic chip, and each of the one or more optical waveguides is optically coupled with a respective mode adapter that transitions an optical mode of an optical signal between a first mode size at the respective optical waveguide and a second mode size that substantially matches a mode size of a corresponding optical fiber of the one or more optical fibers. The mode adapter may be implemented within the photonic chip (e.g., as a waveguide adapter) or external to the photonic chip (e.g., as a lens arrangement). Beneficially, by substantially matching the mode sizes, coupling losses between the one or more fibers and the one or more optical waveguides may be reduced.

Figure 1:
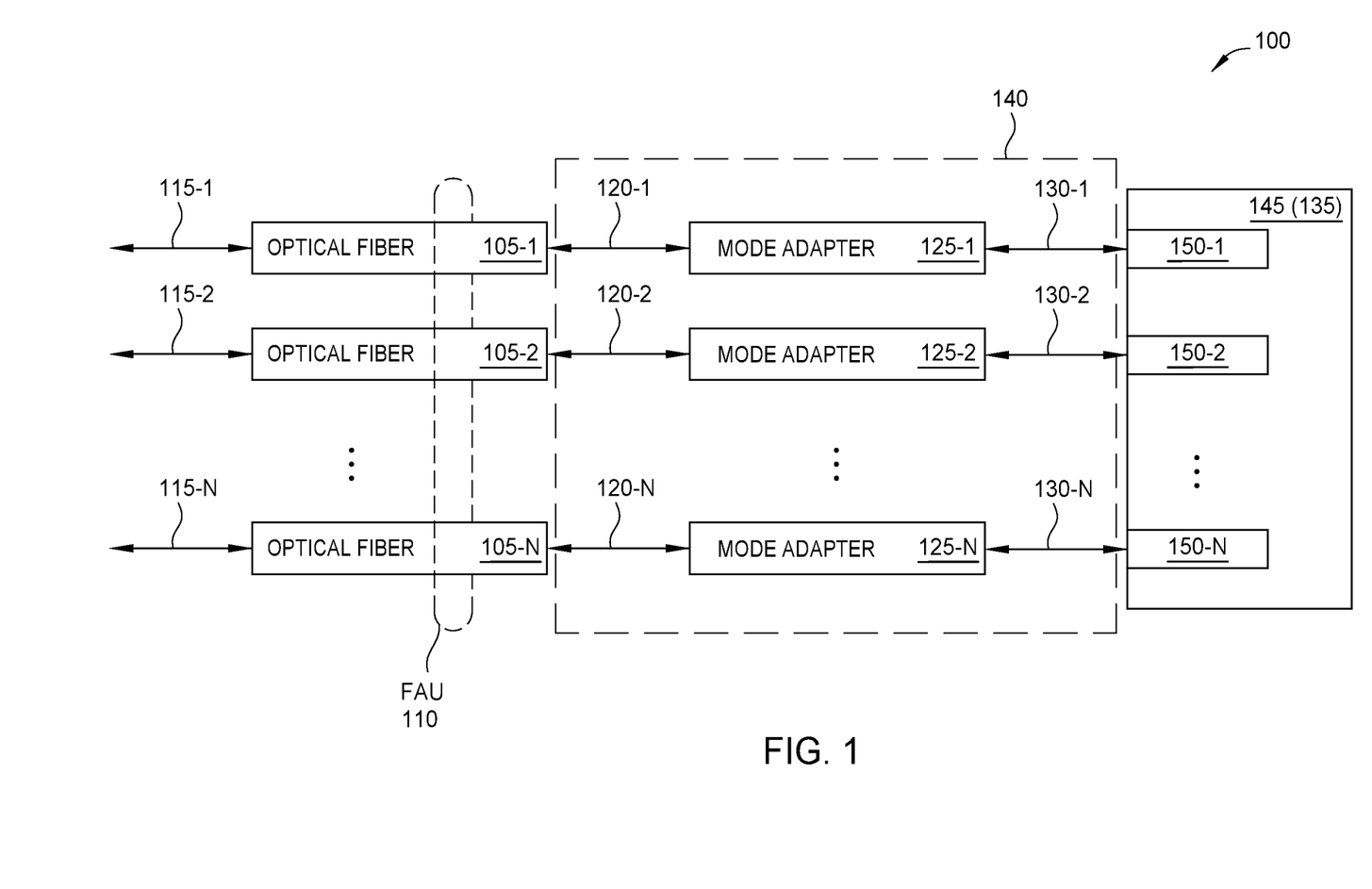
FIG. 1 is a block diagram of an exemplary optical apparatus, according to one or more embodiments.

FIG. 1 is a block diagram of an exemplary optical apparatus 100, according to one or more embodiments. The optical apparatus 100 comprises one or more optical fibers (shown and discussed as a plurality of optical fibers 105-1, 105-2, . . . , 105-N), a FAU 110, and an external light-carrying medium 135. Each of the one or more optical fibers may have any suitable form, such as a single-mode fiber of any suitable size, a multi-core fiber (i.e., an optical fiber having multiple light-carrying cores), and so forth. The plurality of optical fibers 105-1, 105-2, . . . , 105-N may be of a same type (e.g., all single-mode fibers) or of different types (e.g., one or more single-mode fibers and one or more multi-core fibers).

The FAU 110 arranges the plurality of optical fibers 105-1, 105-2, . . . , 105-N with a predefined arrangement. In some embodiments, the FAU 110 arranges the plurality of optical fibers 105-1, 105-2, . . . , 105-N with a predefined spacing (e.g., a constant pitch). For example, the FAU 110 may include a plurality of grooves, each of which is dimensioned to receive a portion of a respective optical fiber of the plurality of optical fibers 105-1, 105-2, . . . , 105-N.

The FAU 110 may be monolithically formed or formed from multiple components that are attached together. In some embodiments, the FAU 110 comprises a base having a plurality of grooves, and a lid that presses the plurality of optical fibers 105-1, 105-2, . . . , 105-N into the predefined arrangement in the plurality of grooves. The FAU 110 may be formed of any suitable material(s), such as glass, ceramic, plastic, a semiconductor material, and so forth. In some embodiments, the material(s) of the FAU 110 comprises an optically transmissive material, such that an adhesive applied to the FAU 110 (e.g., between the base and the lid) may be cured by applying ultraviolet (UV) light through a portion of the FAU 110 (e.g., transmitted through the lid) to rigidly attach the FAU 110 to the plurality of optical fibers 105-1, 105-2, . . . , 105-N.

In some embodiments, the FAU 110 comprises an unfinished endface, and the plurality of optical fibers 105-1, 105-2, . . . , 105-N extend through the FAU 110 and terminate at the unfinished endface. As discussed herein, an "unfinished" endface indicates that a fine polishing process has not been performed on the endface of the FAU 110. In some embodiments, forming the unfinished endface of the FAU 110 comprises one or more of: mechanical sawing, surface grinding, scribing and cleaving, and coarse polishing. In some cases, a fine polishing process is performed following a coarse polishing process on the endface. An exemplary coarse polishing process uses a polishing film having a grit size between about 5 microns (e.g., a grit number of about 4500) and about 12 microns (e.g., a grit number of about 1600). As discussed herein, an exemplary fine polishing process uses a polishing film having a grit size that is less than 5 microns. For example, the polishing film may have a grit size of about 1 micron or less (corresponding to a grit number of at least 14000). In some cases, the unfinished endface of the FAU may be formed without performing any polishing processes (e.g., neither a coarse polishing process nor a fine polishing process). In some embodiments, an average roughness (Ra) of the endface is greater than 1.0 microinch. For example, the average roughness may be within a range between about 1.0 microinch and about 9.0 microinches. In some embodiments, the endface of the FAU 110 is formed by mechanically sawing the FAU 110 using a saw blade having a grit number between 400 and 1200.

No matter which process(es) are used to form the unfinished endface of the FAU 110, any suitable process parameters are contemplated. Using mechanical sawing as an example, the process may include applying water or another suitable lubricant to the saw blade (e.g., a wet saw) to assist with the cleaving of the FAU 110. Other process parameters, such as the blade roughness (e.g., grit number) and the blade speed, may be controlled to reduce a risk of chipping at the unfinished endface of the FAU 110 (corresponding to a risk of chipping at the endface of the individual optical fibers 105-1, 105-2, . . . , 105-N).

The plurality of optical fibers 105-1, 105-2, . . . , 105-N are optically coupled with an external light-carrying medium 135 through the unfinished endface of the FAU 110. In some embodiments, the external light-carrying medium 135 comprises one or more optical waveguides (shown as a plurality of optical waveguides 150-1, 150-2, . . . , 150-N) of a photonic chip 145. Other implementations are also possible, such as one or more optical fibers (e.g., arranged by another FAU 110).

In some embodiments, each of the one or more optical waveguides 150-1, 150-2, . . . , 150-N of the photonic chip 145 is optically coupled with a respective mode adapter 125-1, 125-2, . . . , 125-N. In some embodiments, the mode adapters 125-1, 125-2, . . . , 125-N are implemented within the external light-carrying medium 135. In one example, each mode adapter 125-1, 125-2, . . . , 125-N comprises a respective waveguide adapter formed in the photonic chip 145. In some embodiments, and discussed further with respect FIGS. 7, 8A-8E, 9A, and 9B, each waveguide adapter comprises a multi-prong structure disposed on different layers of the photonic chip 145, and each layer of the different layers is separated by a dielectric material.

In other embodiments, the mode adapters 125-1, 125-2, . . . , 125-N are external to the external light-carrying medium 135. For example, each of the mode adapters 125-1, 125-2, . . . , 125-N may be implemented as a lens or other optical component(s) arranged between the plurality of optical fibers 105-1, 105-2, . . . , 105-N and the external light-carrying medium 135.

In some embodiments, the plurality of optical fibers 105-1, 105-2, . . . , 105-N are directly optically coupled with the external light-carrying medium 135. In one example, the plurality of optical fibers 105-1, 105-2, . . . , 105-N are optically coupled with the external light-carrying medium 135 through air. In another example, the plurality of optical fibers 105-1, 105-2, . . . , 105-N are optically coupled with the external light-carrying medium 135 through an index-matching material 140 such as an epoxy. The index-matching material 140 may be cured (e.g., using heat or UV light) to rigidly attach the FAU 110 with the external light-carrying medium 135. Beneficially, use of the index-matching material 140 makes the coupled light much less sensitive to the quality of the optical fiber endface, as the refractive index remains substantially constant during the transition between the plurality of optical fibers 105-1, 105-2, . . . , 105-N and the external light-carrying medium 135.

In other embodiments, the plurality of optical fibers 105-1, 105-2, . . . , 105-N are indirectly optically coupled with the external light-carrying medium 135 (e.g., through externally-implemented mode adapters 125-1, 125-2, . . . , 125-N). Although the features are discussed separately, it is contemplated that some implementations of the optical apparatus 100 include both the plurality of mode adapters 125-1, 125-2, . . . , 125-N and the index-matching material 140.

Figure 2A:
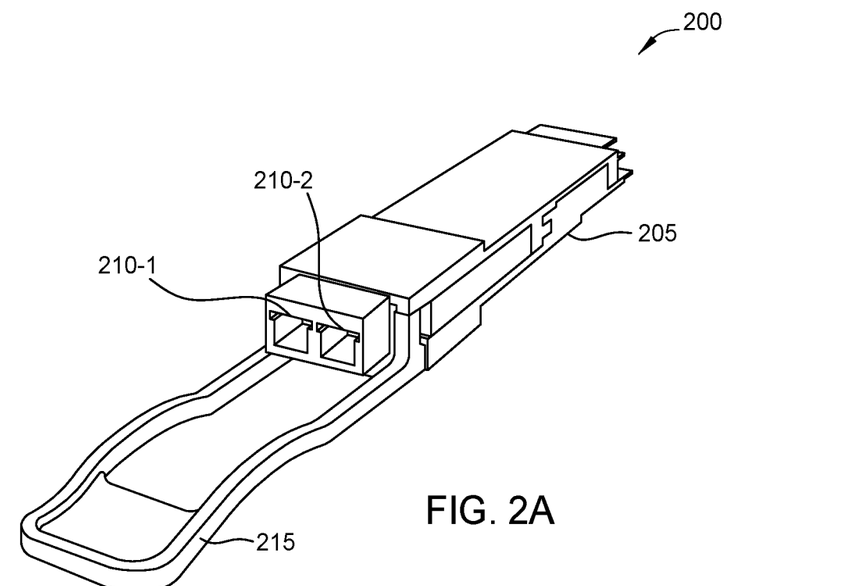
FIG. 2A is an exterior view of an exemplary transceiver module, according to one or more embodiments.
Figure 2B:
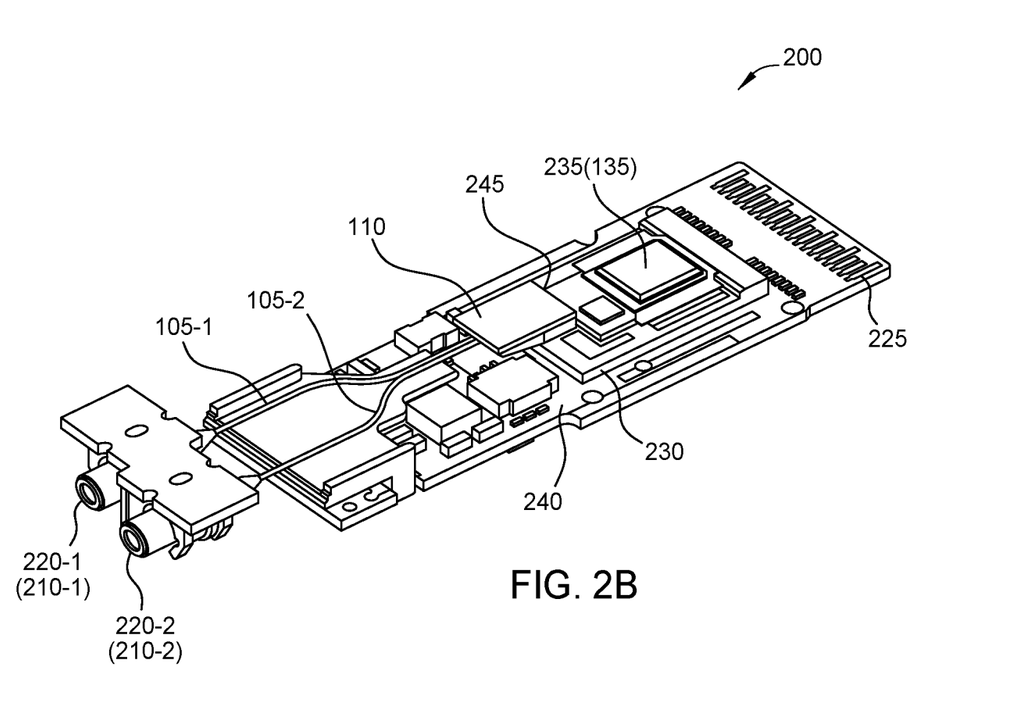
FIG. 2B is an interior view of an exemplary transceiver module, according to one or more embodiments.

FIG. 2A is an exterior view, and FIG. 2B is an interior view, of a transceiver module 200, according to one or more embodiments. The transceiver module 200 represents one example of the optical apparatus 100 of FIG. 1.

The transceiver module 200 may be implemented in any suitable form. For example, the transceiver module 200 may be removably attached to a network switch of a data center. The transceiver module 200 comprises a housing 205 that partly or fully encloses electrical components and/or optical components of the transceiver module 200. The transceiver module 200 further comprises a handle 215 connected with the housing 205 and permitting the transceiver module 200 to be removably attached (e.g., by a technician) to the network switch.

In some embodiments, the housing 205 fully encloses some electrical components and/or optical components of the transceiver module 200, while one or more other electrical components and/or optical components are externally exposed. As shown, the transceiver module 200 comprises optical connectors 210-1, 210-2 and electrical connectors 225 that are externally exposed. The optical connectors 210-1, 210-2 may be implemented in any suitable standardized or proprietary form, such as Multiple-Fiber Push-On/Pull-Off (MPO), Lucent Connector (LC), and so forth. The electrical connectors 225 may be implemented in any suitable standardized or proprietary form, such as conductive traces of an edge connector of a printed circuit board (PCB) 240.

Within the housing 205, internal portions 220-1, 220-2 of the optical connectors 210-1, 210-2 are optically coupled with respective optical fibers 105-1, 105-2. The optical fibers 105-1, 105-2 are arranged by the FAU 110 and are optically coupled with a photonic chip 235 (representing one example of the external light-carrying medium 135) via an unfinished endface 245 of the FAU 110. The FAU 110 and the photonic chip 235 are disposed on a substrate 230 (e.g., a silicon substrate) atop the PCB 240. In some embodiments, the substrate 230, the FAU 110, and the photonic chip 235 are dimensioned such that, when the FAU 110 contacts a reference surface of the substrate 230, the optical fibers 105-1, 105-2 are optically aligned with optical waveguides of the photonic chip 235 in one or more dimensions.

Figure 3:
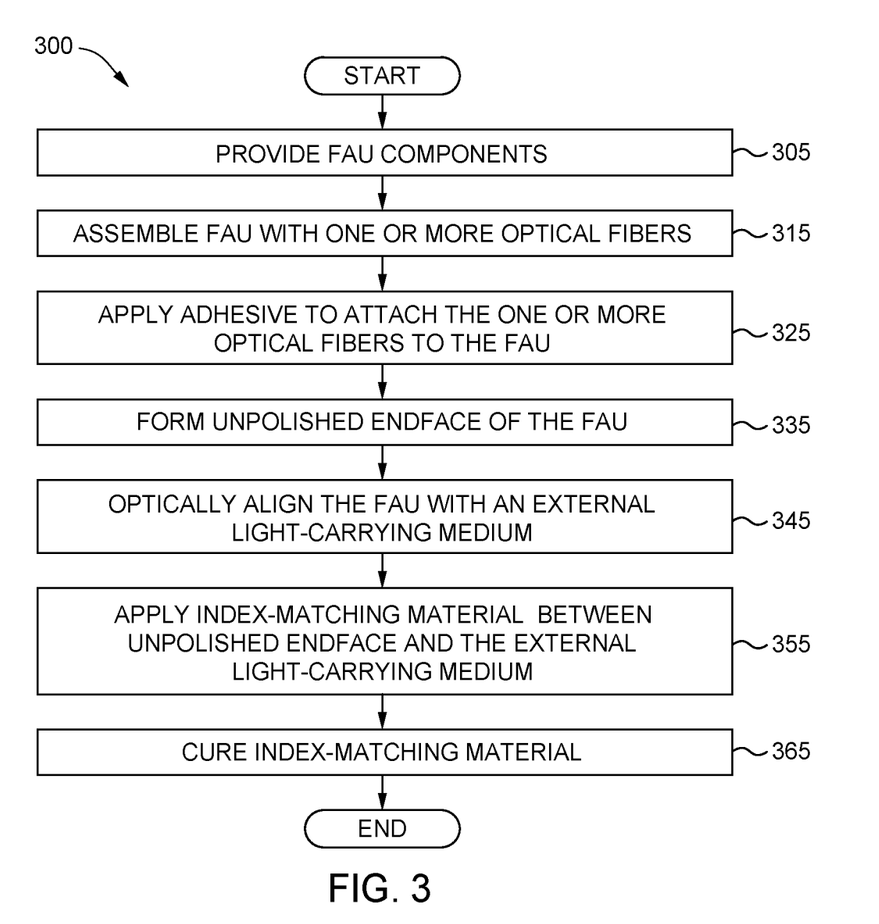
FIG. 3 is a method of manufacturing an optical apparatus, according to one or more embodiments.

FIG. 3 is a method 300 of manufacturing an optical apparatus, according to one or more embodiments. The method 300 may be used in conjunction with other embodiments, e.g., as part of manufacturing the transceiver module 200 of FIGS. 2A and 2B.

Figure 4A:
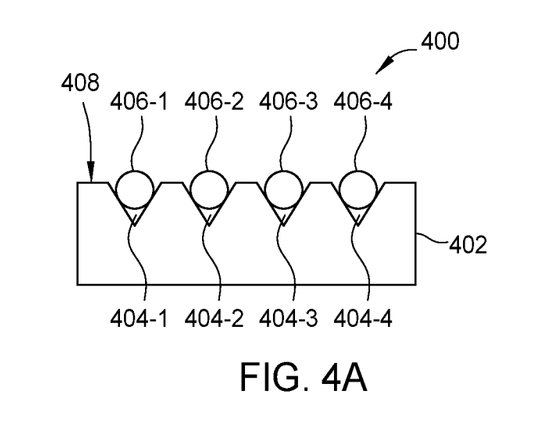
FIGS. 4A-4H illustrate an exemplary sequence of manufacturing an optical apparatus, according to one or more embodiments.
Figure 4B:
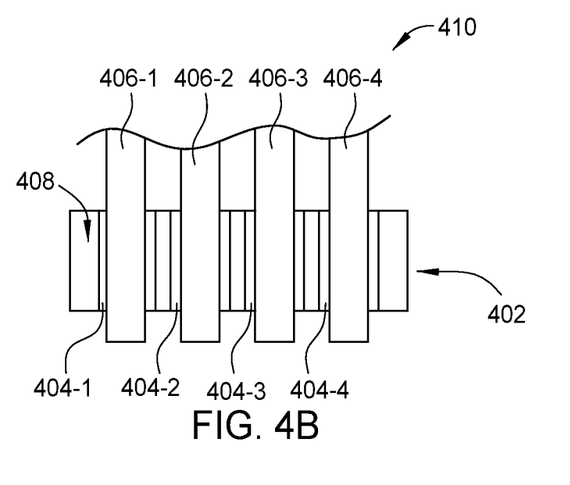

The method 300 begins at block 305, where components of the FAU are provided. In some embodiments, the components of the FAU include a base 402 and a lid 414 of the FAU. At block 315, the FAU is assembled with one or more optical fibers. Referring now to FIGS. 4A and 4B, diagram 400 provides an end view of the FAU and diagram 410 provides a top view of the FAU. In some embodiments, assembling the FAU comprises inserting a plurality of optical fibers 406-1, 406-2, 406-3, 406-4 into a plurality of grooves 404-1, 404-2, 404-3, 404-4 formed into the base 402 of the FAU.

In some embodiments, the plurality of grooves 404-1, 404-2, 404-3, 404-4 is formed into the base 402 from a top surface 408 of the base 402. The plurality of grooves 404-1, 404-2, 404-3, 404-4 are dimensioned such that the plurality of optical fibers 406-1, 406-2, 406-3, 406-4 have a predefined arrangement when the plurality of optical fibers 406-1, 406-2, 406-3, 406-4 contact the plurality of grooves 404-1, 404-2, 404-3, 404-4. Although the plurality of grooves 404-1, 404-2, 404-3, 404-4 are shown as v-shaped, other shapes are also contemplated (e.g., u-shaped).

Figure 4C:
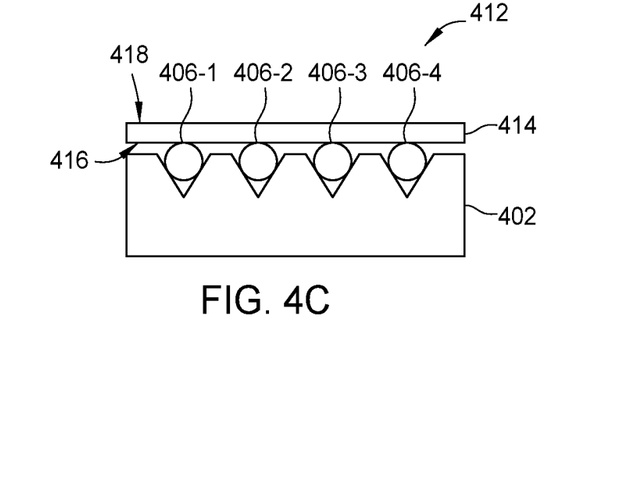
Figure 4D:
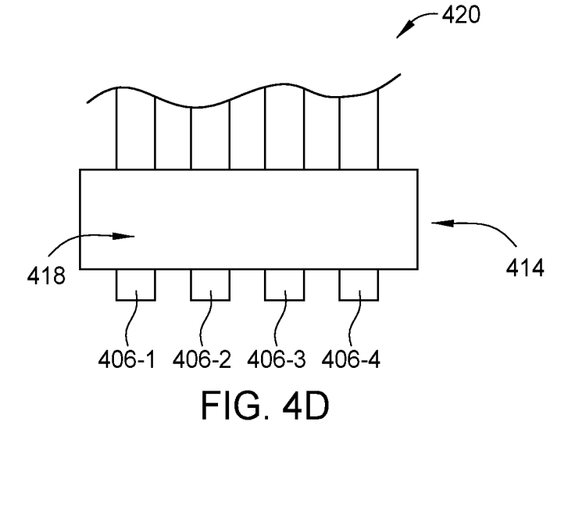

Referring now to FIGS. 4C and 4D, diagram 412 provides an end view of the FAU and diagram 420 provides a top view of the FAU. The lid 414 comprises a top surface 418 and an opposing bottom surface 416. In some embodiments, each of the top surface 418 and the bottom surface 416 is substantially planar, although other configurations are also contemplated. The bottom surface 416 contacts the plurality of optical fibers 406-1, 406-2, 406-3, 406-4, ensuring that each of the plurality of optical fibers 406-1, 406-2, 406-3, 406-4 is "seated" or placed in a predefined arrangement relative to a respective groove of the plurality of grooves 404-1, 404-2, 404-3, 404-4.

Figure 4E:
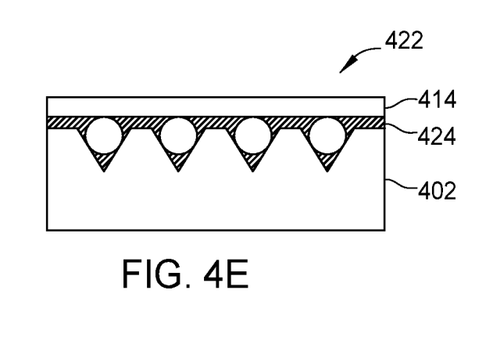
Figure 4F:
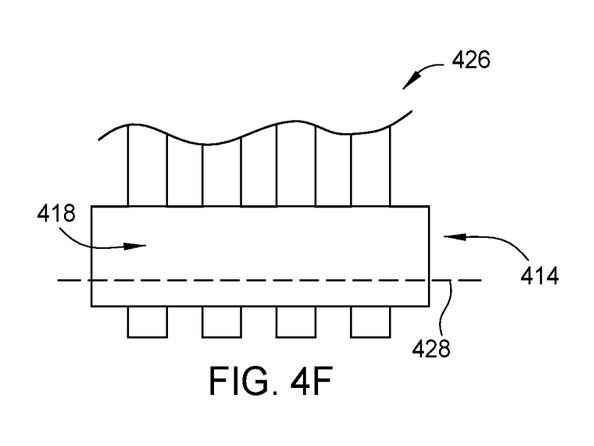

At block 325, an adhesive is applied to attach the one or more optical fibers to the FAU. Referring now to FIGS. 4E and 4F, diagram 422 provides an end view of the FAU and diagram 426 provides a top view of the FAU. In some embodiments, applying an adhesive comprises wicking an epoxy 424 into the volume between the lid 414 and the base 402, which may include wicking the epoxy 424 into a portion of the plurality of grooves 404-1, 404-2, 404-3, 404-4. In some embodiments, the epoxy 424 is an index-matching epoxy. In some embodiments, the epoxy 424 may then be cured to rigidly attach the lid 414, the base 402, and the plurality of optical fibers 406-1, 406-2, 406-3, 406-4.

Figure 4G:
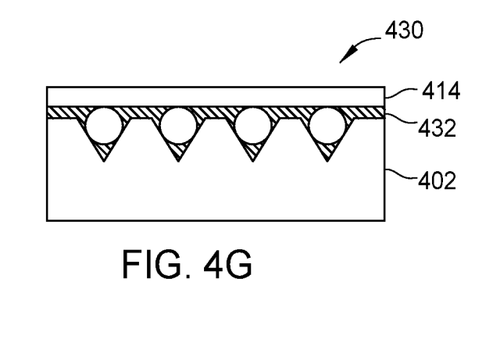

In some embodiments, curing the epoxy 424 comprises applying heat. In other embodiments, the base 402 and/or the lid 414 are formed of an optically transmissive material, and curing the epoxy 424 comprises applying UV light through one of the base 402 and the lid 414. The cured epoxy 432 is illustrated in diagram 430 of FIG. 4G.

Figure 4H:
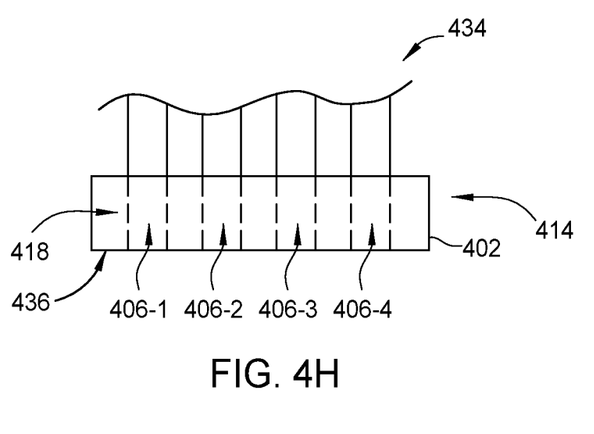

At block 335, an unfinished endface 436 of the FAU is formed. In some embodiments, forming the unfinished endface 436 of the FAU comprises one or more of: mechanical sawing, surface grinding, scribing and cleaving, and coarse polishing. The endface processing is performed to a line 428 (shown in diagram 434 of FIG. 4H) to form the unfinished endface 436. In some embodiments, the unfinished endface 436 is substantially planar. In some embodiments, the unfinished endface 436 is substantially orthogonal to long axes of the plurality of optical fibers 406-1, 406-2, 406-3, 406-4. After the endface processing is performed, the plurality of optical fibers 406-1, 406-2, 406-3, 406-4 extend through the FAU and terminate the unfinished endface 436.

At block 345, the FAU is optically aligned with an external light-carrying medium. In some embodiments, the plurality of optical fibers 406-1, 406-2, 406-3, 406-4 is optically coupled with the external light-carrying medium through the unfinished endface 436. At block 355, an index-matching material is applied between the unfinished endface 436 and the external light-carrying medium. The plurality of optical fibers are optically coupled with the external light-carrying medium through the index-matching material. At block 365, the index-matching material is cured and the FAU is rigidly attached to the external light-carrying medium. In some embodiments, the index-matching material is the same as the adhesive applied at block 325, although this is not a requirement. In this case, curing the index-matching material comprises one of applying heat and applying UV light. The method 300 ends following completion of block 365.

Figure 5:
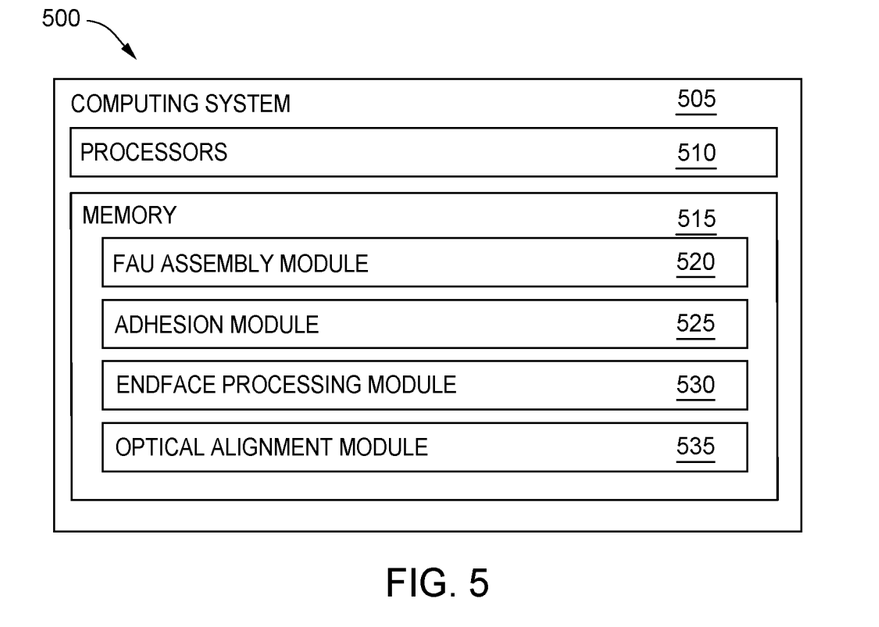
FIG. 5 illustrates an exemplary computing system for manufacturing an optical apparatus, according to one or more embodiments.

FIG. 5 is a diagram 500 illustrating an exemplary computing system 505 for manufacturing an optical apparatus, according to one or more embodiments. The computing system 505 may be used in conjunction with other embodiments, such as used to perform the method 300 of FIG. 3.

The computing system 505 may be implemented in any suitable form. In some embodiments, the computing system 505 comprises a singular computing device, such as a controller interfaced with, and configured to control the operation of, one or more manufacturing systems. In other embodiments, the computing system 505 comprises a plurality of computing devices that are networked together, e.g., via a local access network (LAN) and/or a wide area network (WAN).

The computing system 505 comprises one or more computer processors 510 and a memory 515. The one or more computer processors 510 may be implemented in any suitable form, such as a general purpose microprocessor, a controller, an application-specific integrated circuit (ASIC), and so forth. The memory 515 of the computing system 505 may include a variety of computer-readable media selected for their size, relative performance, or other capabilities: volatile and/or non-volatile media, removable and/or non-removable media, etc.

The memory 515 may include one or more modules for performing various functions described herein. In one embodiment, each module includes program code that is executable by the one or more computer processors 510. However, other embodiments may include modules that are partially or fully implemented in hardware (i.e., circuitry) or firmware of the computing system 505.

As shown, the memory 515 comprises a FAU assembly module 520, an adhesion module 525, an endface processing module 530, and an optical alignment module 535. In some embodiments, the FAU assembly module 520 controls a robotics system that arranges the components of the FAU, e.g. by inserting a plurality of optical fibers into a plurality of grooves of a base of the FAU, and by contacting a lid to the plurality of optical fibers. In some embodiments, the adhesion module 525 controls a robotics system that applies an epoxy or other suitable adhesive to the FAU. In some embodiments, the adhesion module 525 further controls the robotic system to apply the epoxy or other suitable adhesive between an unfinished endface of the FAU and an external light-carrying medium. In some embodiments, the adhesion module 525 further controls a heating system and/or UV light system to cure the epoxy/adhesive.

In some embodiments, the endface processing module 530 controls a robotic system that performs at least one of: mechanical sawing, surface grinding, and scribing and cleaving to form an unfinished endface of the FAU. The plurality of optical fibers extend through the FAU and terminate at the unfinished endface.

In some embodiments, the optical alignment module 535 controls a robotic system that displaces the FAU and/or the external light-carrying medium to achieve optical alignment. In some embodiments, the optical alignment module 535 further controls an optical test system for communicating optical signal(s) between the FAU and the external light-carrying medium, and measuring signal strength of received optical signal(s) (e.g., an active optical alignment).

Figure 6:
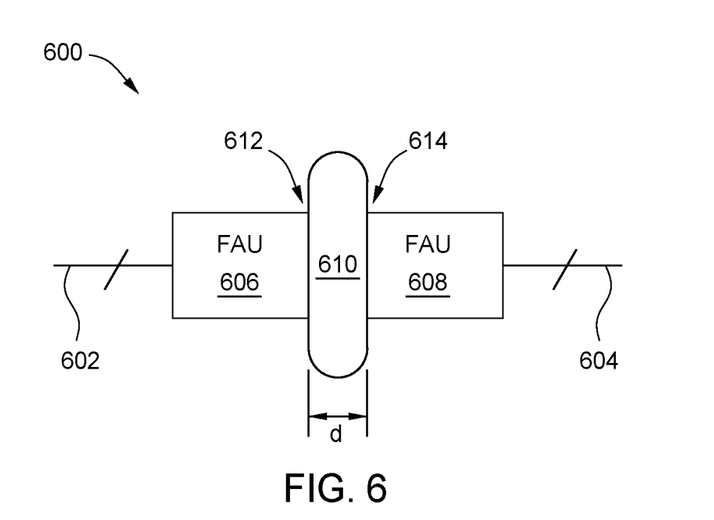
FIG. 6 illustrates an exemplary optical test apparatus, according to one or more embodiments.

FIG. 6 illustrates an exemplary optical test apparatus 600, according to one or more embodiments. The features illustrated in FIG. 6 may be used in conjunction with other embodiments. For examples, FAUs 606, 608 may represent examples of the FAU 110 depicted in FIGS. 1, 2A, and 2B.

The optical test apparatus 600 comprises a ribbon 602 comprising a plurality of optical fibers. In one embodiment, the ribbon 602 comprises eight (8) optical fibers, but other suitable numbers are also contemplated. The plurality of optical fibers are arranged by a first FAU 606, and extend through the first FAU 606 and terminate at an endface 612 of the first FAU 606.

The optical test apparatus 600 further comprises a ribbon 604 comprising a plurality of optical fibers. In one embodiment, the ribbon 604 comprises eight (8) optical fibers (matching the number of optical fibers included in the ribbon 602), but other suitable numbers are also contemplated. The plurality of optical fibers are arranged by a second FAU 608, and extend through the second FAU 608 and terminate at an endface 614 of the second FAU 608.

The optical fibers of the FAUs 606, 608 are optically aligned with each other (e.g., by operation of the optical alignment module 535 of FIG. 5) through the respective endfaces 612, 614. The endfaces 612, 614 of the FAUs 606, 608 are spaced apart from each other by a distance d. In some embodiments, the distance d is between 10 and 20 microns. An index-matching epoxy 610 is applied between the endfaces 612, 614 and cured to rigidly attach the FAUs 606, 608.

In some embodiments, the respective endfaces 612, 614 of the FAUs 606, 608 are unfinished (e.g., formed according to the sequence illustrated in FIGS. 4A-4H). In a first experimental setup, unfinished endfaces 612, 614 (e.g., a saw-cut FAU) provided a measured coupling loss between the FAUs 606, 608 with a mean of 0.336 dB and a standard deviation of 0.14 dB. In comparison, in a second experimental setup, the endfaces 612, 614 when fine-polished provided a measured coupling loss with a mean of 0.327 dB and a standard deviation of 0.12 dB. Unexpectedly, the FAUs 606, 608 having unfinished endfaces 612, 614 that are optically coupled through the index-matching epoxy 610 are capable of nearly identical performance as FAUs 606, 608 having fine-polished endfaces 612, 614. The standard deviation appears to be slightly greater for the unfinished endfaces 612, 614 (0.14 dB compared to 0.12 dB) due to a potentially larger variation in the endface angles of the individual optical fibers.

Figure 7:
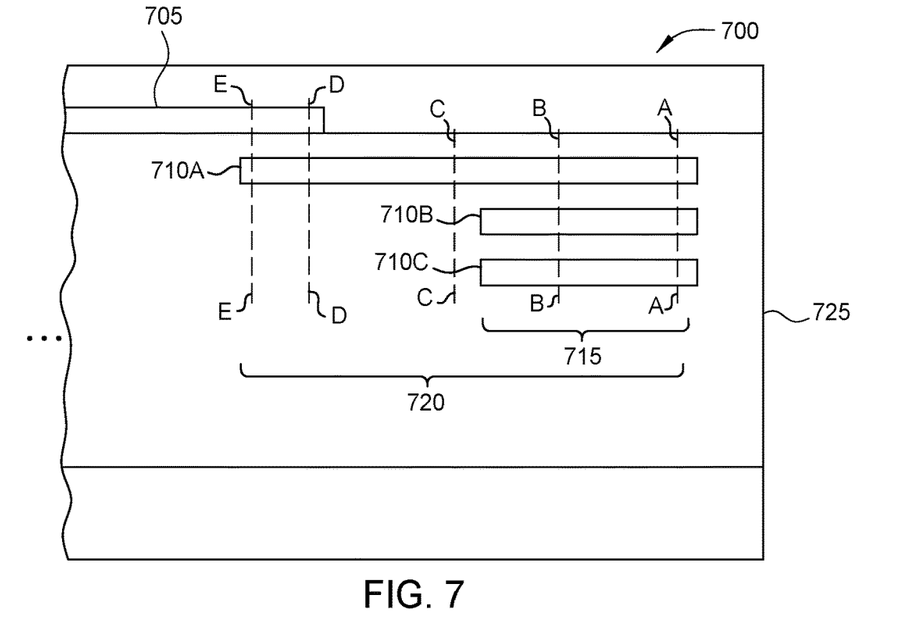
FIG. 7 illustrates an exemplary edge coupler, according to one or more embodiments.

FIG. 7 illustrates a side view 700 of a photonic chip that includes an edge coupler 720 formed using a multi-prong, embedded structure. Here, a silicon waveguide 705 is formed above the edge coupler 720 (e.g., the edge coupler 720 may be embedded in an insulation layer of the photonic chip). However, in another embodiment, the multi-prong structure may be flipped relative to the silicon waveguide 705 such that the prongs of the edge coupler 720 are formed in layers above the silicon waveguide 705 (i.e., the silicon waveguide 705 is between the prongs of the edge coupler 720 and the insulation layer). Although not shown, the silicon waveguide 705 couples an optical signal between one or more optical components and the edge coupler 720.

As shown in the side view 700, one interface of the edge coupler 720 is coupled to the silicon waveguide 705, while another interface is optically exposed at the side surface 725 of the photonic chip. The side surface 725 may be etched or unetched. As used herein, "optically exposed" means that the edge coupler 720 is physically exposed at the side surface 725 or is slightly recessed from the side surface 725 (e.g., 1-5 microns) but can nonetheless optically couple externally to a FAU.

The edge coupler 720 includes a waveguide adapter 715 which can be optically coupled to an external optical device, such as an optical fiber of a FAU. The edge coupler 720 is made of separate prongs 710A, 710B, 710C that may include the same material (e.g., silicon nitride or silicon oxynitride) embedded in an insulative material (e.g., silicon dioxide or silicon oxynitride). In one embodiment, the material of the prongs 710A, 710B, 710C and the edge coupler 720 may be different from the material of the insulation layer of the photonic chip. Generally, the edge coupler 720 may be made of any material having a higher refractive index than the material of the insulative material surrounding the prongs 710A, 710B, 710C.

Figure 8A:
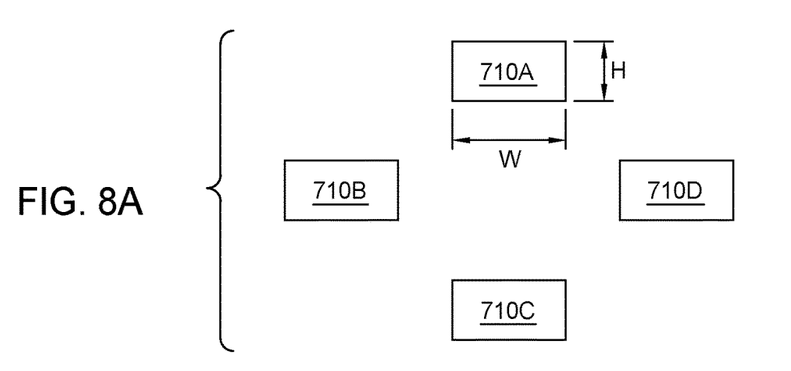
FIGS. 8A-8E illustrates different cross-sectional views of the edge coupler of FIG. 7, according to one or more embodiments.

FIGS. 8A-8E illustrate cross-sectional views of the edge coupler 720 of FIG. 7, according to one or more embodiments. Specifically, FIG. 8A illustrates the cross section A-A of a portion of the waveguide adapter 715 that is closest to the side surface 725 (or coupling interface). Here, the waveguide adapter 715 includes four separate prongs 710A, 710B, 710C, 710D that may have the same or similar width (W) and height (H) (or thickness) dimensions. These dimensions, as well as the spacing between the prongs 710A, 710B, 710C, 710D may vary depending on the specific application. In the example shown, the waveguide adapter 715 may be configured to interface with a single mode optical fiber with a 10 micron mode field diameter. As will be appreciated by one of ordinary skill in the art, these dimensions may vary depending on the specific application. Specifically, the dimensions may be chosen such that the mode of the prong at the coupling interface substantially matches the mode of the external device to which light is to be coupled to or from. As described herein, "substantially matches" includes a case in which the mode sizes are equal, as well as cases in which the mode sizes are within about 25% of each other. Here, the width of the prongs 710A, 710B, 710C, 710D may range from approximately 200-300 nanometers with a height between 100-250 nanometers. More specifically, the width may be around 200 nanometers while the height is approximately 200 nanometers. The distance between prong 710A and prong 710C and the distance between prong 710D and prong 710B may be around two microns. As mentioned above, the dimensions, as well as the spacing, of the prongs 710A, 710B, 710C, 710D may vary according to the mode or design of the external light source coupled to the photonic chip.

Figure 8B:
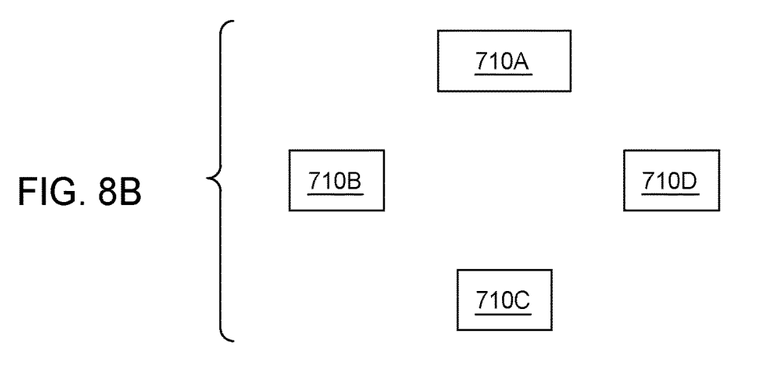

FIG. 8B illustrates the cross section B-B of the waveguide adapter 715. This figure shows that as the multi-prong adapter is recessed away from the neighboring edge coupler, the width of the prongs 710B, 710C, 710D reduces while the width of prong 710A increases. As shown, the tapering of widths of the prongs 710A, 710B, 710C, 710D is done in an adiabatic fashion. The tapering results in a gradual transition of optical energy from an optical mode which is confined by the prongs 710A, 710B, 710C, 710D at the right side of the waveguide adapter 715 where the widths and heights of the prongs 710A, 710B, 710C, 710D are same or similar to a mode which is gradually confined more and more in the upper prong 710A at positions farther to the left in the waveguide adapter 715. This tapering transfers the optical energy confined by prongs 710A, 710B, 710C, 710D to prong 710A alone. However, the opposite is also true. That is, tapering the widths also enables a signal introduced in the upper prong 710A to be transferred to a mode confined by prongs 710A, 710B, 710C, 710D as the optical signal propagates from left to right. The widths of the prongs 710A, 710B, 710C, 710D may change continuously (e.g., a linear or non-linear fashion such as exponentially or at higher order polynomial profiles) or, in an alternate embodiment, at discrete increments as the waveguide adapter 715 extends from right to left. As shown in FIG. 8, eventually the prongs 710B, 710C, 710D terminate (which ends the waveguide adapter 715) while prong 710A continues to transmit the optical signal. In one embodiment, the waveguide adapter 715 may have a length of approximately 100 to 500 microns. Furthermore, the waveguide adapter 715 may taper for all of this length or for only a portion thereof. For example, the widths of the prongs 710A, 710B, 710C, 710D may remain substantially equivalent for the first five to fifty microns before the widths of prongs 710A, 710B, 710C, 710D begin to change.

Figure 8C:
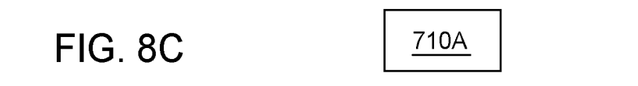

FIG. 8C illustrates the cross section C-C of the edge coupler 720. Here, the waveguide adapter 715 has terminated which leaves the prong 710A to carry the optical signal. Although shown as being linear, the prong 710A may bend or twist to carry the optical signal to different areas of the photonic chip or testing structure. Thus, the length of the prong 710A may be much larger than the lengths of prongs 710B, 710C, 710D to enable the prong 710A to carry an optical signal to different areas.

Figure 8D:
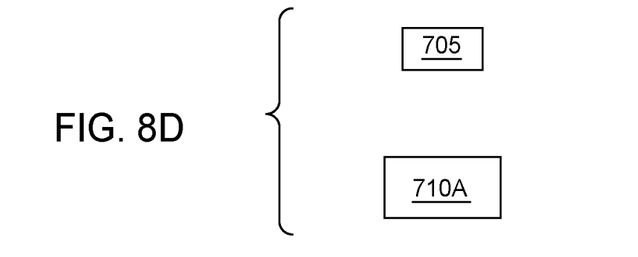

FIG. 8D illustrates the cross section D-D of the edge coupler 720 and the silicon waveguide 705. As shown, the width of the prong 710A is larger than the width of the silicon waveguide 705. Moreover, the distance between the prong 710A and the silicon waveguide 705 may range from hundreds of nanometers to only a few nanometers depending on the techniques used to fabricate the wafer. Depending on the technique used to fabricate the semiconductor wafer, a portion of the prong 710A may directly contact the silicon waveguide 705.

Figure 8E:
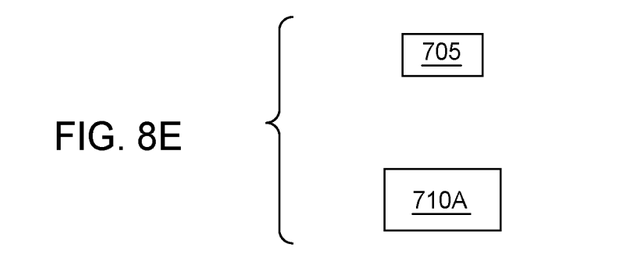

FIG. 8E illustrates the cross section E-E of the edge coupler 720 and the silicon waveguide 705. Here, the width of the prong 710A has shrunk while the width of the silicon waveguide 705 has increased. This tapering, which is again shown in an adiabatic fashion, results in the optical signal in the prong 710A to transfer to the silicon waveguide 705 and vice versa with minimal loss. Eventually, the prong 710A terminates and the silicon waveguide 705 may carry the optical signal to different optical components, e.g., in the photonic chip.

Although the embodiments above discuss tapering the prongs 710A, 710B, 710C, 710D by changing the width, a similar transfer of optical power may occur if the heights are tapered, or some combination of both. However, tapering the height of the prongs 710A, 710B, 710C, 710D may require different lithography and fabrication techniques or materials than tapering the widths as shown in FIGS. 8A-8E. It is also not necessary that the widths of all the prongs are tapered. For example, in certain designs the required transfer of optical energy can be obtained by just tapering the width of 710A alone while the widths of prongs 710B, 710C, 710D are not tapered.

Figure 9A:
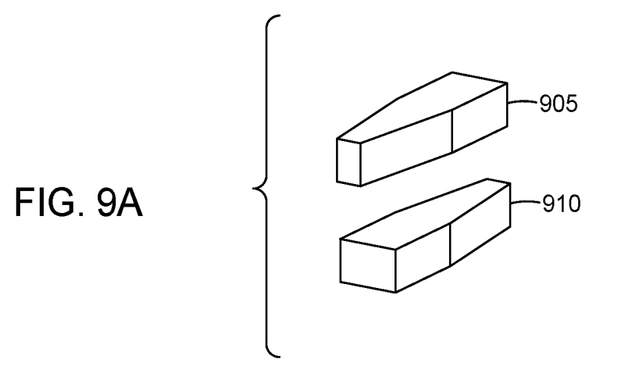
FIGS. 9A and 9B illustrate a tapered waveguide, according to one or more embodiments.
Figure 9B:
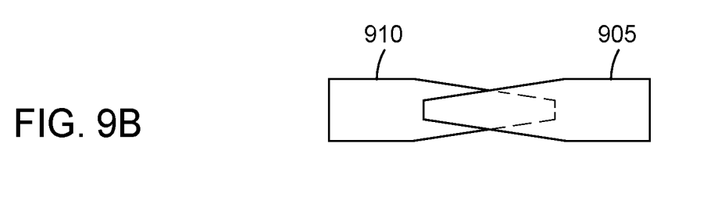

FIGS. 9A and 9B illustrate views of a tapered waveguide, according to one or more embodiments. More specifically, FIGS. 9A and 9B illustrate a partially overlapping, inverse-taper waveguide structure for transferring an optical signal between waveguides. As shown, FIG. 9A illustrates a plan view of a first tapered waveguide 905 partially overlapping a second tapered waveguide 910. Specifically, FIG. 9A may be the arrangement of the portion of a photonic chip in FIG. 7 where silicon waveguide 705 overlaps the prong 710A. The tapering of the waveguides is done adiabatically to minimize optical loss. Although FIGS. 9A and 9B illustrate that the widths of the tapers vary linearly, the waveguides can also taper in a non-linear fashion, for example, exponential or some higher-order polynomial profile as long as the adiabatic criterion is satisfied. In one embodiment, the distance between the first tapered waveguide 905 and the second tapered waveguide 910 is less than a micron. For example, the first tapered waveguide 905 and the second tapered waveguide 910 may be separated by 100 nanometers or less. The separation distance may affect the efficiency with which an optical signal may transfer between the first tapered waveguide 905 and the second tapered waveguide 910, and thus, a structure may be designed such that the first tapered waveguide 905 and the second tapered waveguide 910 are as close as fabrication techniques allow.

FIG. 9B illustrates a top view of the first tapered waveguide 905 and the second tapered waveguide 910. By at least partially overlapping the first tapered waveguide 905 and the second tapered waveguide 910, an optical signal may be transferred between waveguides in different layers in the semiconductor wafer. In one embodiment, the first tapered waveguide 905 and the second tapered waveguide 910 partially overlap where their respective ends begin to taper. The slope or change of the taper may depend on the material used for forming the first tapered waveguide 905 and the second tapered waveguide 910. In one embodiment, at the widest point, the first tapered waveguide 905 and the second tapered waveguide 910 may have a width that ranges from 200 nanometers to 2 microns. At the narrowest point, the first tapered waveguide 905 and the second tapered waveguide 910 may have a width from 100 nanometers to 200 nanometers. The length of the tapering portion may range from 10 microns to 50 microns—e.g., around 20 microns.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of manufacturing an optical apparatus, the method comprising:
    attaching one or more optical fibers to a body of a fiber array unit (FAU), wherein the body of the FAU provides an arrangement of the one or more optical fibers, wherein the one or more optical fibers extend through the body of the FAU and beyond a first endface of the body;
    performing endface processing on the body of the FAU at the first endface to form a second, unfinished endface of the body, wherein performing the endface processing on the body of the FAU truncates the one or more optical fibers and causes the one or more optical fibers to terminate at the unfinished endface; and
    optically aligning the FAU with an external light-carrying medium,
    wherein the one or more optical fibers are optically coupled with the external light-carrying medium through the unfinished endface,
    wherein the external light-carrying medium comprises one or more optical waveguides of a photonic chip,
    wherein each of the one or more optical waveguides is optically coupled with a respective mode adapter, and
    wherein each mode adapter is operable to transition an optical mode of an optical signal between a first mode size at the respective optical waveguide and a second mode size that substantially matches a mode size of a corresponding optical fiber of the one or more optical fibers.

2. The method of claim 1, wherein performing the endface processing comprises one or more of: mechanical sawing, surface grinding, scribing and cleaving, and coarse polishing on the body of the FAU.

3. The method of claim 1, further comprising:
applying an index-matching material between the unfinished endface and the external light-carrying medium,
wherein the one or more optical fibers are optically coupled with the external light-carrying medium through the index-matching material.

4. The method of claim 3, further comprising:
curing the index-matching material, wherein the FAU is rigidly attached to the external light-carrying medium.

5. The method of claim 1, wherein each mode adapter comprises a respective waveguide adapter formed in the photonic chip.

6. The method of claim 5,
wherein each waveguide adapter comprises a multi-prong structure disposed on different layers of the photonic chip, and
wherein each layer of the different layers is separated by a dielectric material.

7. The method of claim 1,
wherein the one or more optical fibers comprises a plurality of optical fibers, and
wherein the body of the FAU comprises:
a base having a plurality of grooves; and
a lid that presses the plurality of optical fibers into the plurality of grooves to provide the arrangement of the plurality of optical fibers.

8. An apparatus comprising:
one or more optical fibers;
a fiber array unit (FAU) having a body, wherein the one or more optical fibers attach to the body to provide an arrangement of the one or more optical fibers, the body defining an unfinished endface at which the one or more optical fibers terminate,
wherein the unfinished endface is formed by performing endface processing on the body of the FAU, wherein the endface processing truncates the one or more optical fibers and causes the one or more optical fibers to terminate at the unfinished endface; and
an external light-carrying medium optically coupled with the one or more optical fibers through the unfinished endface,
wherein the external light-carrying medium comprises one or more optical waveguides of a photonic chip,
wherein each of the one or more optical waveguides is optically coupled with a respective mode adapter, and
wherein each mode adapter is operable to transition an optical mode of an optical signal between a first mode size at the respective optical waveguide and a second mode size that substantially matches a mode size of a corresponding optical fiber of the one or more optical fibers.

9. The apparatus of claim 8, wherein performing the endface processing comprises one or more of: mechanical sawing, surface grinding, scribing and cleaving, and coarse polishing on the body of the FAU.

10. The apparatus of claim 8, wherein the one or more optical fibers are optically coupled with the external light-carrying medium through an index-matching material applied between the unfinished endface and the external light-carrying medium.

11. The apparatus of claim 8,
wherein each mode adapter comprises a respective waveguide adapter formed in the photonic chip.

12. The apparatus of claim 11,
wherein each waveguide adapter comprises a multi-prong structure disposed on different layers of the photonic chip, and
wherein each layer of the different layers is separated by a dielectric material.

13. The apparatus of claim 8,
wherein the one or more optical fibers comprises a plurality of optical fibers, and
wherein the body of the FAU comprises:
a base having a plurality of grooves; and
a lid that presses the plurality of optical fibers into the plurality of grooves to provide the arrangement of the plurality of optical fibers.

14. A method of manufacturing an optical apparatus, the method comprising:
attaching one or more optical fibers to a body of a fiber array unit (FAU), wherein the body of the FAU provides an arrangement of the one or more optical fibers, wherein the one or more optical fibers extend through the body of the FAU and beyond a first endface of the body, wherein the one or more optical fibers terminate at a second endface of the body having an average roughness (Ra) that is greater than 1.0 microinch, wherein the second endface is formed by performing endface processing on the body of the FAU at the first endface, wherein the endface processing truncates the one or more optical fibers to terminate at the second endface; and
optically aligning the FAU with an external light-carrying medium,
wherein the one or more optical fibers are optically coupled with the external light-carrying medium through the second endface,
wherein the external light-carrying medium comprises one or more optical waveguides of a photonic chip,
wherein each of the one or more optical waveguides is optically coupled with a respective mode adapter, and
wherein each mode adapter is operable to transition an optical mode of an optical signal between a first mode size at the respective optical waveguide and a second mode size that substantially matches a mode size of a corresponding optical fiber of the one or more optical fibers.

15. The method of claim 14, wherein the average roughness of the second endface is within a range between about 1.0 microinch and about 9.0 microinches.

16. The method of claim 14, wherein performing endface processing comprises one or more of:
mechanically sawing the body of the FAU using a saw blade having a grit number between 400 and 1200;
surface grinding the body of the FAU;
scribing and cleaving the body of the FAU; and
coarse polishing the body of the FAU.

17. The method of claim 14, further comprising:
applying an index-matching material between the second endface and the external light-carrying medium,
wherein the one or more optical fibers are optically coupled with the external light-carrying medium through the index-matching material.

18. The method of claim 14, wherein each mode adapter comprises a respective waveguide adapter formed in the photonic chip.

19. The method of claim 18,
wherein each waveguide adapter comprises a multi-prong structure disposed on different layers of the photonic chip, and
wherein each layer of the different layers is separated by a dielectric material.

20. The method of claim 14,
wherein the one or more optical fibers comprises a plurality of optical fibers, and
wherein the body of the FAU comprises:
 a base having a plurality of grooves; and
 a lid that presses the plurality of optical fibers into the plurality of grooves to provide the arrangement of the plurality of optical fibers.

\* \* \* \* \*